United States Patent
Mikeska et al.

Patent Number: 6,159,104
Date of Patent: Dec. 12, 2000

[54] PROTECTIVE DEVICE FOR A DRIVE ASSEMBLY WITH A DOUBLE UNIVERSAL JOINT

[75] Inventors: Felix Mikeska, Lohmar; Clemens Nienhaus, Neunkirchen-Seelscheid; Eberhard Wilks, Daufenbach, all of Germany

[73] Assignee: GKN Walterscheid GmbH, Lohmar, Germany

[21] Appl. No.: 09/344,919

[22] Filed: Jun. 28, 1999

[30] Foreign Application Priority Data

Jul. 1, 1998 [DE] Germany ............................ 198 29 314

[51] Int. Cl.[7] ........................................................ F16D 3/84
[52] U.S. Cl. ........................ 464/175; 464/173; 464/172; 464/170
[58] Field of Search ................................ 280/240; 74/608, 74/609; 464/173, 175, 172, 170, 113, 133, 134; 277/634, 636, 637; 180/53.1; 403/134, 78, 79, 192, 193, 347, 194, 207, 300, 301, 302, 341, 345, 346

[56] References Cited

U.S. PATENT DOCUMENTS

| | | | |
|---|---|---|---|
| 3,797,328 | 3/1974 | Quirk | 74/609 |
| 4,157,019 | 6/1979 | von Allworden | 464/175 |
| 4,605,332 | 8/1986 | Mayhew et al. | |
| 5,046,990 | 9/1991 | Mikeska et al. | 464/175 |
| 5,346,431 | 9/1994 | Okuyama et al. | 464/171 |
| 5,895,323 | 4/1999 | Benzi | 464/173 |

FOREIGN PATENT DOCUMENTS

| | | |
|---|---|---|
| 2249741 | 4/1999 | Canada . |
| 0908083 A1 | 9/1998 | European Pat. Off. . |
| 20 46 236 U | 4/1971 | Germany . |
| 2609069 B1 | 9/1977 | Germany . |
| 30 33 850 A1 | 3/1982 | Germany . |
| 3820449 A1 | 12/1989 | Germany . |
| 195 41 512 C1 | 5/1997 | Germany . |

*Primary Examiner*—Lynne H. Browne
*Assistant Examiner*—Aaron Dunwoody
*Attorney, Agent, or Firm*—Harness, Dickey & Pierce, P.L.C.

[57] ABSTRACT

A protective device for a drive assembly with a double universal joint (1) has a protective cone (10) with folds (15). At the cone's first axial end (11), it is secured to a bearing assembly (12). At its second axial end, the cone (10) includes a fixing portion (14) which is connected to a guiding ring (18). The guiding ring (18), via its inner end (21) projects into the part of the protective cone (10) which is provided with the folds. The guiding ring (18) itself is supported on a bearing ring (23). The bearing ring (23), in turn, is supported on an inner double yoke (5). An axial relative movement is permitted between the guiding ring (18) and the bearing ring (23). The guiding ring (18) ensures that the protective cone (10), with the folds (15), is well supported under articulation conditions. Furthermore, the protective cone (10) with its folds (15) has a relatively long length without losing any of its stability.

5 Claims, 2 Drawing Sheets

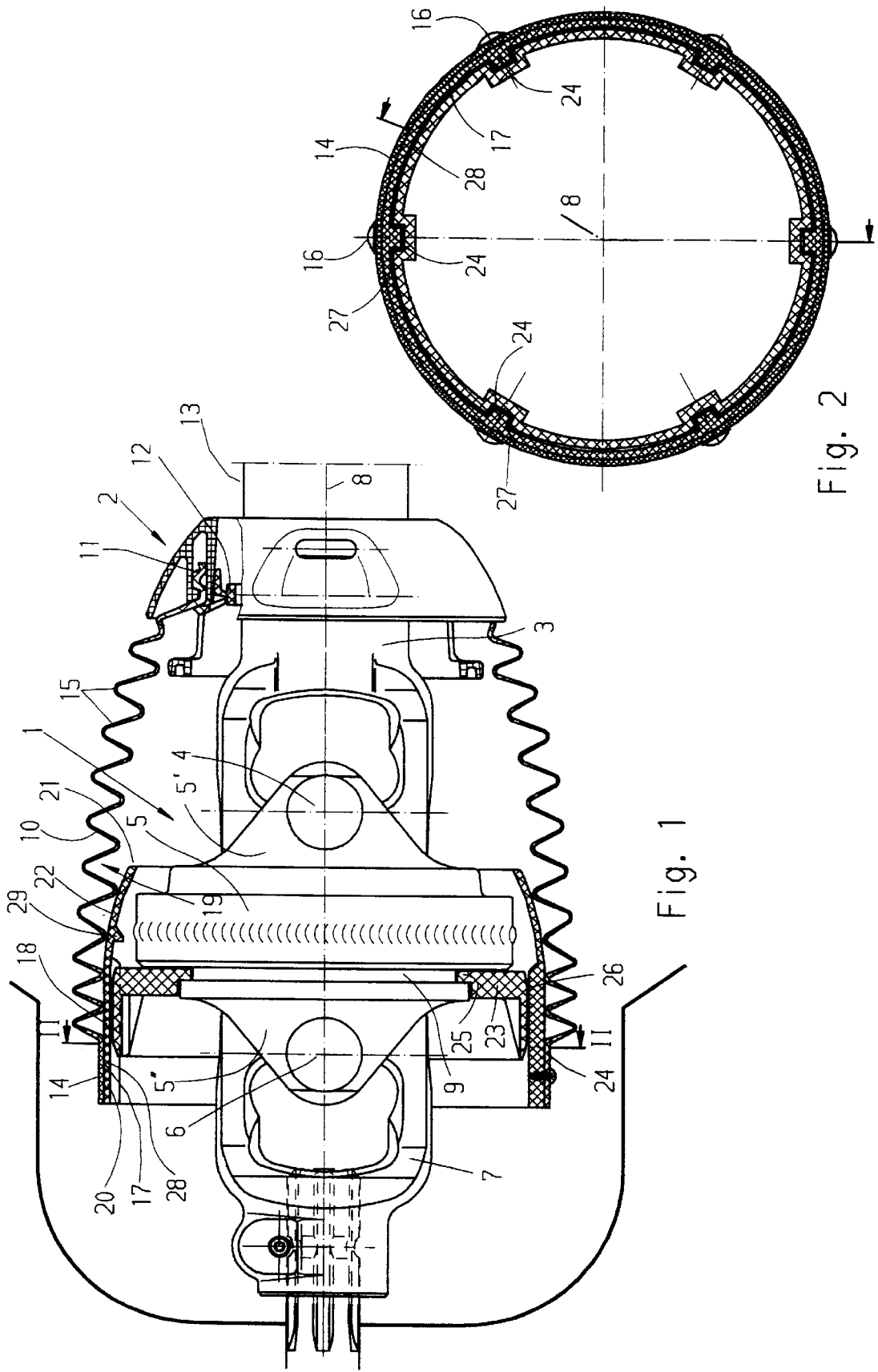

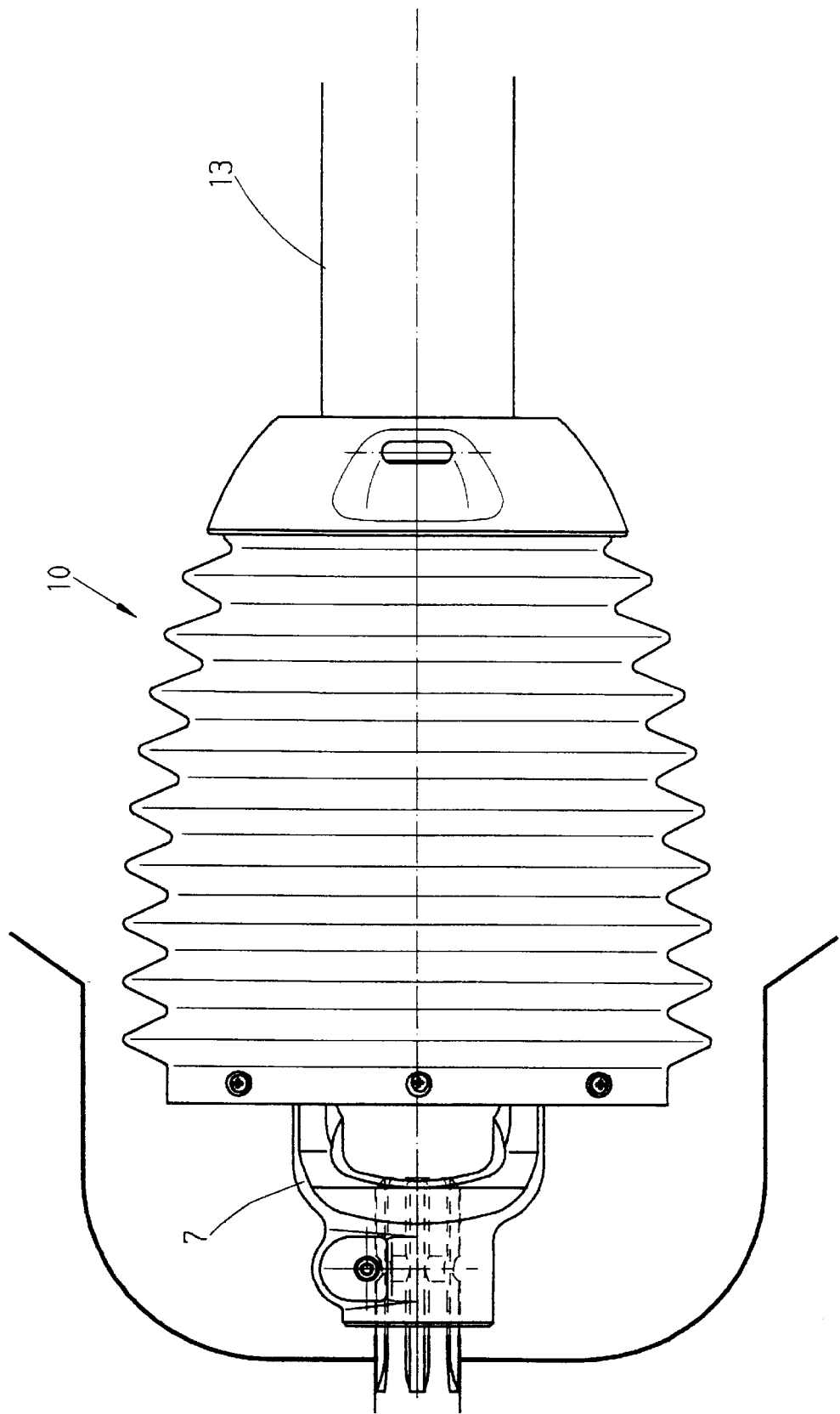

PROTECTIVE DEVICE FOR A DRIVE ASSEMBLY WITH A DOUBLE UNIVERSAL JOINT

CROSS-REFERENCE TO RELATED APPLICATIONS

This application claims priority upon German application 198 29 314.3 filed Jul. 1, 1998, which is incorporated herein by reference.

BACKGROUND OF THE INVENTION

The invention relates to a protective device for a drive assembly. The drive assembly includes a double universal joint with an inner double yoke, a first and second joint yoke and cross members. The cross members articulatably connect the first joint yoke and the second joint yoke to one of the yokes of the double yoke.

DE-OS 20 46 236 proposes a protective device for a double universal joint. The protective device has a protective head which is associated with the first joint yoke. The protective element is rotatably supported on the inner double yoke. The head extends over one end of a protective element. The protective element is rotatably supported on the inner double yoke and covers the partial regions of the double yoke positioned on one side of the bearing. The protecting region of the protective element facing away from the protective head extends into a protective cone. A gap occurs between the elements of the protective device when the double universal joint is articulated. The gap enables undesirable engagement from the outside. Furthermore, when a load is applied by external forces, adequate resistance does not exist. This is due to the fact that the protective elements are each laterally open and can be deformed accordingly. As a result, contact may occur with the rotating part of the double universal joint. Contact may result in damage, which eliminates the protective function.

SUMMARY OF THE INVENTION

It is an object of the present invention to provide a protective device for a drive assembly with a double universal joint. The protective device safely covers the rotating components of the double universal joint. Accordingly, undesirable contact, even when the joint is articulated, is eliminated.

In accordance with the invention, a protective device includes a protective cone with a first axial end, a second axial end and intermediate folds. The folds enable elastic deformation. The first axial end of the protective cone is connected to a bearing assembly. The bearing assembly is supported on the first joint yoke. The second axial end has a hollow-cylindrical fixing portion with a bore. A bearing ring is rotatably supported around an axis of rotation at the double yoke. The bearing ring is positioned in the protective cone and includes an outer bearing face. A guiding ring is arranged co-axially around the bearing ring between the outer bearing face and the inner face of the protective cone. An inner guiding face of the guiding rings is displaceable on the outer bearing face of the bearing ring in the direction of the axis of rotation. An outer end portion of the guiding ring is connected to the fixing portion. Starting from the outer end, the guiding ring extends over part of the portion provided with folds as far as its inner end. The guiding ring, towards the inner end, has an outer face portion which, in a longitudinal section, continuously approaches the axis of rotation.

The protective device is complemented by, and partially extends into, the protective head. The protective head is commonly provided at the tractor on the implement. The advantage of this embodiment is that over a relatively long axial length, the protective cone has folds. The folds extend over the inner double joint yoke. Ordinarily, the fixing portion, together with the guiding ring, cover a considerable part of the second joint yoke. The convoluted protective cone is stabilized by the guiding ring. The long length of the folds also enables large articulation angles of approximately eighty degrees. Overall, complete extensive covering of the joint is achieved. Thus, access from outside is not possible. By additionally supporting the protective cone part provided with folds on the guiding ring, it is also possible to ensure a high degree of radial stability in cases where external forces act on the protective device.

According to a further embodiment of the invention, the guiding ring is connected to the bearing ring. Both the guiding ring and bearing ring are held in a stationary condition when the double universal joint surrounded by the protective device rotates. Normally, the protective device is secured relative to a stationary part. Preferably, the protective device is secured to the implement which is driven by the driveshaft including the double universal joint. Thus, protection is provided against contact with the driveshaft components rotating in the protective device. The driveshaft components include a double universal joint which forms part of the drive assembly. This is the reason why a protective tube is connected to the bearing assembly. One end of the protective cone is connected to the bearing assembly and is supported relative to the first joint yoke. The protective tube engages a further protective tube. The protective tubes, together, cover the profiled tubes arranged between two universal joints or a double universal joint and a universal joint. The second joint associated with the driveshaft is also covered by a protective device. The second joint is connected to the implement by fixing means or similar suitable means. Thus, the protective device is stationary. The protective tubes include engaging elements. The protective tube engaging elements prevent rotation. The protective tubes hold the bearing assembly which is connected to the protective cone.

To achieve a rotationally fast connection, the bearing ring has circumferentially distributed guiding grooves. The grooves extend parallel to the axis of rotation. The grooves are engaged by the guiding ring via correspondingly circumferentially distributed guiding wedges which extend parallel to the axis of rotation. The grooves are engaged by the guiding ring via correspondingly circumferentially distributed guiding wedges which extend parallel to the axis of rotation.

This assembly enables axial displacement of the guiding ring relative to the bearing ring. Thus, by compressing the folds of the protective cone, the position of the guiding ring can be changed manually. This enables release of the coupling means of the second joint yoke in order to connect it to a driveshaft. Furthermore, the outer face of the guiding ring is used to support the folds of the protective cone. This, in turn, achieves adequate stiffness against external forces.

The guiding ring includes stops. The stops come to rest against the bearing ring. Accordingly, this limits the displacement of the guiding ring relative to the bearing ring in the axial direction, away from the bearing assembly.

From the following detailed description, taken in conjunction with the accompanying drawings and subjoined claims, other objects and advantages of the present invention will become apparent to those skilled in the art.

BRIEF DESCRIPTION OF THE DRAWINGS

An embodiment of the invention is diagrammatically illustrated in the drawing wherein:

FIG. 1 is a longitudinal section view through a drive assembly with a double universal joint and a protective device in accordance with the present invention.

FIG. 2 is a cross-section view of FIG. 1 along line 2—2 thereof.

FIG. 3 is a plan view of the assembly according to FIG. 1.

DETAILED DESCRIPTION OF THE PREFERRED EMBODIMENT

FIG. 1 illustrates a double universal joint 1 in a plan view. The protective device 2 is partially shown in section. FIG. 2 illustrates the protective device in cross-section along line II—II of FIG. 1.

The double universal joint 1 includes a first joint yoke 3. The joint yoke 3 may be connected to a profiled tube (not illustrated) of an intermediate shaft. The profiled tube, by means of a further profiled tube, is connected to a further universal joint or a double universal joint. These joints, in turn, would be attached to the input journal of a to be driven agricultural implement.

A first cross member 4, of which only the base of the bearing bush is visible, articulatably connects the first joint yoke 3 to the first yoke 5' of the inner double yoke 5. The inner double yoke 5 includes a second yoke 5". The second joint yoke 7 is connected to the second yoke 5" by a second cross member 6. The second joint yoke 7 is connected to a power take-off shaft, only partially illustrated, of a tractor. Towards the second yoke 5", the inner double yoke 5 includes an annular groove 9. The annular groove is centered on the axis of rotation 8 of the double universal joint 1. All components of the double universal joint 1 are shown in the aligned position, i.e. at an articulation angle of zero degrees.

The protective device 2 includes a protective cone 10 whose first axial end 11 is connected to a bearing assembly 12. The bearing assembly 12, in turn, is supported on the first joint yoke 3. A protective tube 13, covering the profiled tube connected to the first joint yoke 5, is attached to the bearing assembly 12. The protective tube 13 is connected to a further protective tube and a further protective device. This connection hold the protective tube 13 rotationally fast relative to an implement. This means that only the double universal joint and the profiled shaft connected thereto are able to rotate.

The protective cone 10, at its second axial end, the end remote from the bearing assembly 12, includes a fixing portion 14. The fixing portion 14 is hollow-cylindrical and includes a bore 17. The intermediate region between the first axial end 11 and the fixing portion 14 has folds which rotate around the axis of rotation 8. The second axial end, the fixing portion 14 of the protective cone 10, in its bore 17, receives a guiding ring 18. The guiding ring 18, via its outer face, is approximately flush with the fixing portion 14. Circumferentially distributed bolts 16 secure the fixing portion 14 to the guiding ring 18. A portion of the guiding ring 18, towards the bearing assembly 12, initially extends externally cylindrically and changes into an outer face portion 22 which continuously approaches the rotational axis 8.

In the present case, the portion has a curved shape, when viewed in the longitudinal section of FIG. 1. If viewed from the bearing assembly 12, the guiding ring 18 and the fixing portion 14 are positioned behind the end of the second yoke 5" of the inner double yoke 5. Thus, the guiding ring 18 and fixing portion 14 cover a considerable part of the second joint yoke 7. The second joint yoke 7, in turn, is arranged inside a protective head (not illustrated in detail) and is partially covered by the head.

The guiding ring 18, in its interior, has circumferentially distributed guiding wedges 24. The wedges 24 have rectangular cross-sections which extend, without changing, parallel to the axis of rotation 8. In the guiding ring, intermediate regions, between two guiding wedges 24 which follow one another circumferentially around the axis of rotation, a cylindrical guiding face 28 exists. The guiding face 28 axially changes into a region which approaches the axis of rotation 8 and which extends parallel to the outer face portion 22.

Circumferentially distributed stops 29 are provided at the ends of the guiding face 28. The stops 29 project from the guiding face 28 towards the rotational axis 8. The guiding ring 18, via its inner end 21, extends into the protective cone 10. The extension is such that the outer face portion 22 is positioned opposite the inner face 19 of the protective cone 10. Accordingly, the fold valleys of some folds 15 are able to support themselves on the outer face portion 22. The fixing portion 14 of the protective cone 10 is connected to the end portion 20 of the guiding ring 18.

A bearing ring 23, which includes guiding grooves 27, is coupled with the guiding ring 18. The grooves 27 are circumferentially distributed on the bearing ring 23 in accordance with the guiding wedges 24. The grooves 27 extend parallel to the axis of rotation 8 and are engaged by the guiding wedges 24. The outer bearing face 26 of the bearing ring 23, in the region between the guiding grooves 27, is cylindrical. The outer bearing face 26 is shaped conically or spherically towards its axial ends. The bearing ring 23 includes an annular bearing portion 25 which engages the annular groove 9 of the inner double yoke 5. Thus, the bearing ring 23 is connected to the guiding ring 18 in a rotationally fast way. The guiding ring 18, in turn, is connected in a rotationally fast way to the protective cone 10. The bearing ring 23 and the guiding ring 18 are stationary when the double universal joint 1 rotates.

When the double universal joint 1 is articulated, the folds 15 are compressed or stretched. Compression results in a load being applied to the guiding ring 18. Through the guiding ring stops 29, the load comes to rest against the bearing ring 23 in its outermost position on the left. When external forces act on the protective cone 10, the cone 10 is able to support itself by its folds on the outer face portion 22 of the guiding ring 18. The guiding ring 18, in turn, is supported, via the bearing ring 23, on the inner double yoke 5.

It can also be seen that the entire region from the outer end portion 20 to the bearing assembly 12 is fully covered by the protective cone 10. The above-described assembly enables accurate deflection under articulation conditions. As a result of the supporting means provided, the protective cone 10 neither collapses nor is it able to come into contact with the rotating parts of the double universal joint 1.

FIG. 3 shows a plan view of the protective cone 10 which covers the double universal joint 1. The double universal joint is only partially visible. Only part of the second joint yoke 7 can be seen.

While the above detailed description describes the preferred embodiment of the present invention, the invention is susceptible to modification, variation and alteration without deviating from the scope and fair meaning of the subjoined claims.

What is claimed is:

1. A protective device for a drive assembly, having a double universal joint with an inner double yoke, a first joint yoke, a second joint yoke, cross members articulatably connecting the first joint yoke and the second joint yoke to one of the yokes of the inner double yoke, said protective device comprising:

a protective cone having a first axial end, a second axial end and intermediate folds enabling elastic deformation, said first axial end of said protective cone being connected to a bearing assembly, said bearing assembly being supported on the first joint yoke, said second axial end of said protective cone including a hollow-cylindrical fixing portion with a bore;

a bearing ring rotatably supported around an axis of rotation at the double yoke, said bearing ring positioned in the protective cone and said bearing ring having an outer bearing face;

a guiding ring arranged co-axially around said bearing ring and between said bearing ring outer bearing face and an inner face of said protective cone, said guiding ring including an inner guiding face being displaceable on said outer bearing face of said bearing ring in the direction of the axis of rotation, said guiding ring having an outer end portion connected to the fixing portion and starting from said outer end portion, said guiding ring extending into said protective cone into the portion provided with folds as far as the guiding ring inner end of said guiding ring, said guiding ring having towards the inner end, an outer face portion which, in longitudinal section, continuously approaches the axis of rotation.

2. A protective device according to claim 1, wherein the guiding ring is firmly connected to the bearing ring around the axis of rotation.

3. A protective device according to claim 2, wherein the bearing ring includes circumferentially distributed guiding grooves which extend parallel to the axis of rotation, said guiding grooves being engaged by the guiding ring by correspondingly circumferentially distributed guiding wedges extending parallel to the axis of rotation.

4. A protective device according to claim 1, wherein said outer face of the guiding ring supports folds of said protective cone.

5. A protective device according to claim 1, wherein the axial movement of the guiding ring towards the bearing ring away from the bearing assembly is delimited by stops.

* * * * *